United States Patent [19]

Knecht et al.

[11] 4,091,993
[45] May 30, 1978

[54] TIME VARIABLE THERMOSTAT

[75] Inventors: William A. Knecht, Hartford; Chester J. Zajac, Litchfield, both of Conn.

[73] Assignee: Robertshaw Controls Company, Richmond, Va.

[21] Appl. No.: 694,272

[22] Filed: Jun. 9, 1976

[51] Int. Cl.² .................................................. F23N 5/20
[52] U.S. Cl. ............................... 236/46 R; 307/141.4
[58] Field of Search ............... 236/46 R, 46 E, 47; 165/12; 62/231; 337/301, 302, 303; 219/493; 317/141; 307/141.4

[56] References Cited

U.S. PATENT DOCUMENTS

| | | | |
|---|---|---|---|
| 3,599,863 | 8/1971 | Pinckaers | 236/46 R |
| 3,620,448 | 11/1971 | Nelson | 236/46 R |
| 3,940,441 | 4/1976 | Perkins et al. | 236/46 R |

*Primary Examiner*—William E. Wayner
*Attorney, Agent, or Firm*—Harold W. Adams; Auzville Jackson, Jr.

[57] ABSTRACT

The invention is a time variable thermostatic device adapted for direct connection into a low voltage, two-wire, alternating current control circuit of a heating or cooling unit arranged to vary the temperature set point of a thermostat at selected times to control the operation of the heating or cooling unit. Circuit means including a transformer having primary and secondary windings interconnect in the two-wire control circuit a thermostat having a thermostatic switch, a starting relay or gas valve actuator and a timing means having a timing means that is a multiple of the frequency of the AC voltage in the control circuit together with mechanical means for changing the temperature set point at the desired time of day. The circuit permits actuation of the starting relay and operation of the heating or cooling unit only when the thermostatic switch is closed.

4 Claims, 4 Drawing Figures

4,091,993

TIME VARIABLE THERMOSTAT

BACKGROUND OF THE INVENTION

Electrical thermostats for changing the ambient temperature setting of the thermostat at selected times and thus control the operation of a heating or cooling unit are well known. Customarily, available thermostatic devices of this type are installed in a two-wire, low voltage control circuit in a position remote from the furnace or air conditioner to be controlled. In designing electrical circuits to permit this type of installation and operation without requiring additional wiring to the thermostat many attempts have been made to utilize the low voltage (typically 24V AC) of the control circuit to drive the necessary timing mechanism and to actuate the starting relay or gas valve actuator in the case of a gas furnace, only when the thermostat calls for heat.

In practice, to the inventor's knowledge, all such circuits designed for direct connection into existing twowire control circuits without additional wiring have required either an additional source of power to drive the timing mechanism such as a battery (see co-pending United States Patent Application, Ser. No. 497,151, filed Aug. 13, 1974, now U.S. Pat. No. 3,948,441 which issued Apr. 6, 1976 and assigned to the same Assignee as this application) or some form of means for receiving and storing energy from the two-wire control circuit during periods when the timing mechanism does not require electrical energy (see the earlier invention described in co-pending United States Patent Application, Ser. No. 706,667, filed July 19, 1976 and assigned to the same Assignee as this application).

In the above devices, which represent the current state of the art to the inventor's knowledge, each requires a timing mechanism with its own time base that is independent of the frequency of alternating current in the low voltage control circuit. While various methods have been used, such as spring-wound clock mechanisms and battery-operated clock movements, none, to the inventor's knowledge, has heretofore been devised that makes it possible at low cost to drive a sychronous motor for a timing mechanism directly from an existing two-wire thermostat without any additional wiring being required.

SUMMARY OF THE INVENTION

An object of this invention is to overcome the above disadvantage by providing a unique and novel time variable thermostat including timing means that run synchronous with the same or a submultiple of the frequency of the alternating current voltage in the two-wire control circuit while at the same time providing for actuation of the starting relay or gas valve actuator only when the thermostatic switch is closed.

BRIEF DESCRIPTION OF THE INVENTION

Figure 1:
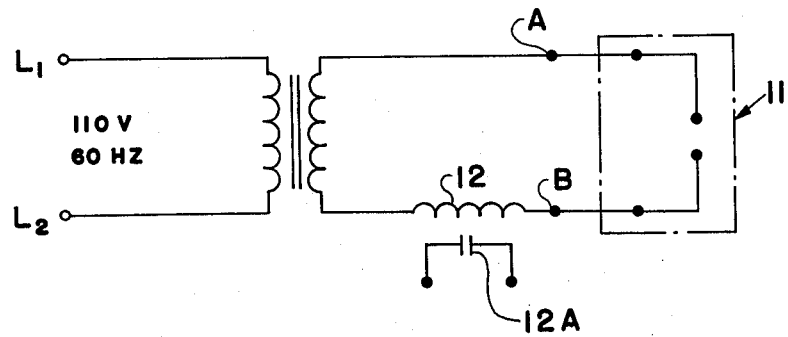
FIG. 1 is an electrical schematic of a conventional two-wire furnace control circuit in which a thermostat with switch is connected in series with a furnace starting relay in a two-wire control circuit.

Referring to a typical two wire thermostat control circuit for a furnace as shown in FIG. 1, it can readily be seen that the closure of the thermostatic switch 11 reduces the voltage across the switch to zero and actuates the starting relay 12 to close relay contacts 12 A to operate a furnace not shown. Typically, the thermostat switch 11 is remotely located from the furnace controlled and that portion of the circuit to the left of points A and B is inside a wall or otherwise inaccessible to the user.

Thus, as can be seen, the difficulty that must be solved in providing a time variable thermostat that can be directly connected to points A and B and provide the desired control without the need of additional wiring is to extract enough power at all times, whether the thermostat switch 11 is open or closed to operate a timing means but without adversely affecting actuation of the starting relay of the furnace.

Figure 2:
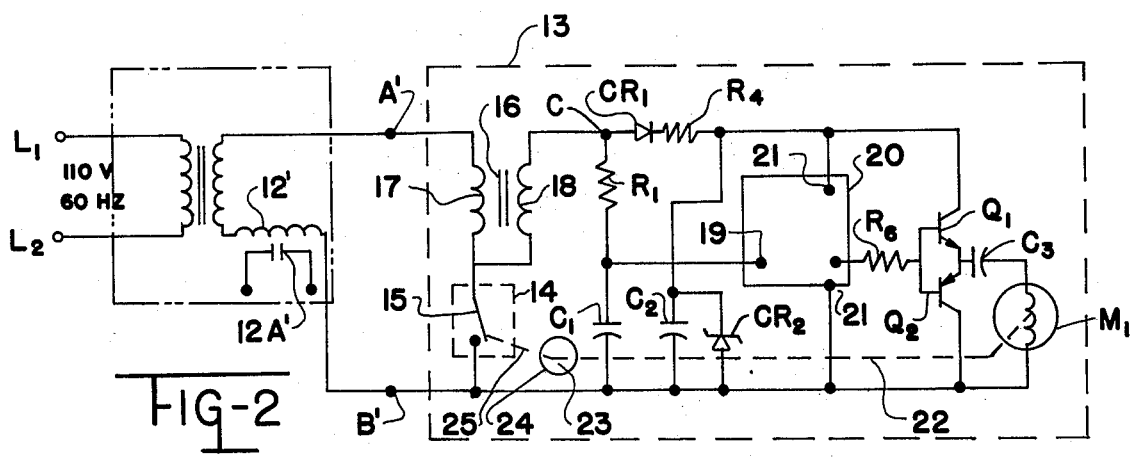
FIG. 2 is an electrical schematic of a preferred embodiment of the invention installed in a two-wire control circuit of a furnace and in which a timing device runs synchronous with the two-wire control circuit line frequency.

A preferred embodiment of this invention illustrated in FIG. 2 and which overcomes the difficulties of conventional thermostat control circuits in a unique and novel way can best be understood by describing its operation. As shown in FIG. 2 that part of the circuit to the left of points A' and B' is the same as that to the left of points A and B in FIG. 1 including a step down voltage transformer and a furnace starting relay 12' having contacts 12 A'.

The invention is shown in the dotted enclosure designated by reference numeral 13 and includes a conventional electrical room thermostat 14 having means to adjust the temperature setting or set point of a thermostatic switch 15. A commercially available thermostat that can be used in practicing the invention is the Model TH200 thermostat manufactured by the Grayson Division, Robertshaw Controls Company, 100 West Victoria Street, Long Beach, California. As is well known the thermostat 14 is designed to close switch 15 when the ambient temperature is below the temperature set point a determined number of degrees and may include a variable resistance which acts to anticipate temperature swings and prevent overshoot as is well known.

With switch 15 open as shown, transformer 16 with primary winding 17 and secondary winding 18 interconnects the open thermostatic switch 15, starting relay 12' and a timing device enclosed in dotted lines and generally designated by the reference numeral 13 that includes means for rectifying (CR1) the continuous alternating current secondary winding voltage. The resulting half wave DC voltage is applied to a filtering capacitor C2 which charges to the peak value of the half wave or as regulated by Zener diode CR2 which conducts when the peak voltage at point C exceeds CR2's breakdown voltage. Current in limit resistor R4 results in a voltage drop reducing the peak voltage applied to C2. Therefore, even though the voltage at point C may vary appreciably a relatively constant DC voltage is supplied to C2 and the rest of the circuit. C2 serves to store and supply energy on command to operate stepper motor M1 as will be explained.

The 60 HZ AC voltage at point C is applied to input terminal 19 of a "Divide by 60" integrated circuit counter 20 through resistor R1 and AC coupling capacitor C1. Power is supplied at terminals 21. A commercially available "Divide by 60" counter that has proven satisfactory for operation is the model MC 14566 Integrated Circuit Counter manufactured by Motorola Instruments and Controls, Inc.

Figure 3:
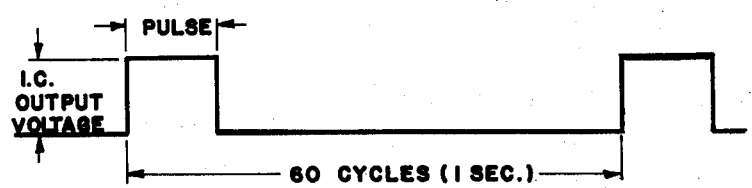
FIG. 3 is a wave diagram illustrating the manner in which the two-wire control circuit line frequency is divided by an integrated circuit to provide a pulsating output having a pulse rate that is a multiple of the control circuit voltage frequency.

The counter 20 counts the number of cycles of the AC input applied to terminal 19 and exactly at the count of 60 provides a positive output pulse (FIG. 3) across resistor R6 to transistor Q1 turning it on. Capacitor C2 then discharges through the stepping motor $M_1$ (FIG. 4) and transistor Q1 to charge C3 causing the motor to make one step through a fixed angle. As the pulse across R6 goes to zero, transistor Q1 goes off and transistor Q2 conducts allowing capacitor C3 to discharge through transistor Q2 and stepping motor $M_1$ providing a pulse of reverse polarity. Motor $M_1$ then steps again through the same angle.

This cycle repeats every 60 cycles of the AC voltage in the control circuit so the motor $M_1$ turns one revolution each second. Motor $M_1$ through conventional gearing 22 drives the hands or dial 23 of clock mechanism 24 which in turn mechanically changes the temperature set point of thermostatic switch 15 at selected times as by a suitable cam means 25 as is well known. The clock mechanism can be arranged to operate on a 12, 24 or other hourly duty cycle.

Figure 4:
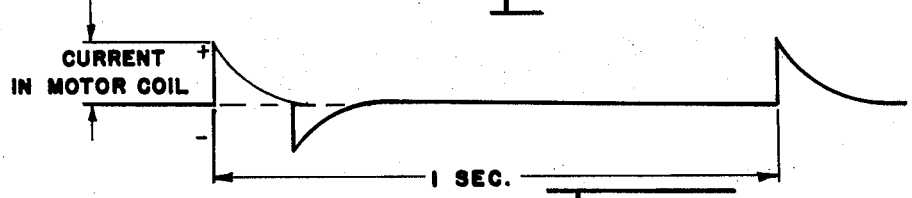
FIG. 4 is a wave diagram of the pulsating current that flows in the coil of a stepping motor that drives a timing mechanism also in synchronization the control circuit voltage frequency.

As can be seen, the stepping motor $M_1$ advances one step for each output pulse of frequency divider 20 so the step rate is an exact submultiple of the control circuit voltage frequency. Thus, the clock mechanism is driven in synchronization with the line voltage frequency and no other time base is required. As shown in FIG. 4, the circuit is arranged so that voltage is applied to the coil of the motor $M_1$ only during the relatively short interval when capacitor C3 is charging or discharging. Very little power is consumed during the at rest period and the average power consumption may be as low as a few milliwatts.

Transformer 16 is designed to provide a voltage at points C and B at all times regardless of the position of switch 15. Thus with switch 15 closed transformer 16 operates as a current transformer. Its primary offers very low impedence to current flow so its introduction in series with relay 12 has a negligible effect, and relay 12 actuates in the normal manner. During this period current flowing in the primary 17 of transformer 16 induces a voltage in the secondary 18 providing a voltage at points C and B.

When the thermostat 14 no longer calls for heat or cooling, switch 15 is opened. Transformer primary 17 and secondary 18 furnish a series path to continue to provide operating voltage at points C and B to operate the timing device.

It is to understood the invention may also be employed to control a gas valve actuator of a gas furnace in the same manner. In practice as some gas valves (also magnetically operated when energized) have a higher impedance and thus more sensitive to smaller currents an additional impedance may be required in the transformer secondary to reduce the current in the gas valve actuator without impairing the operation of the timer with the thermostatic switch 15 open. With this modification, the choking action of the transformer secondary 18 is less significant.

While a preferred embodiment has been described in detail the invention is to be limited only to the scope of the appended claims.

What is claimed is:

1. In a time variable thermostatic device adapted for connection without additional wiring into a two-wire control circuit of a heating or cooling system that includes a starting relay for operating said heating or cooling system when actuated the improvement comprising:

thermostatic control means including a thermostatic switch having at least two temperature set points, said switch closing when said ambient temperature varies a determined amount from either of said selected set points;

electrical timer means including a stepper motor for periodically changing the temperature set point of said thermostatic control means to and from said two respective values at determined intervals; and circuit means including a transformer having inductively coupled primary and secondary windings interconnecting said timer means, said thermostatic control means, and said starting relay in said two-wire control circuit and providing a continuous alternating current in said secondary winding in either position of said thermostatic switch, said starting relay being actuated only with said thermostatic switch in said electrical timer means closed;

frequency responsive means connected to said secondary winding for generating a series of output voltage pulses, the rate of pulse generation being a submultiple of the frequency of said continuous alternating current; and means for applying said output voltage pulses to said stepper motor whereby said timer means is sychronized with the frequency of said continuous alternating current.

2. The invention as defined in claim 1 wherein said frequency responsive means comprises a frequency counter, said counter providing timed output pulses as a function of the frequency of said continuous alternating current.

3. The invention as defined in claim 2 including rectifier means connected to said secondary winding of said transformer.

4. In a time variable thermostatic device adapted for direct connection into a low voltage, two wire, alternating current control circuit of a heating or cooling unit that includes a starting relay for operating said heating or cooling system when actuated, said thermostatic device including a timing device arranged to vary the temperature set point of a thermostatic switch at selected times the improvement comprising:

circuit means including a transformer having primary and secondary windings for interconnecting in said two wire control circuit said thermostatic switch, said starting relay and said timing means, said timing means including frequency responsive means having a time base that is a multiple of the frequency of the alternating current voltage in said two wire control circuit, said circuit means enabling energization of said starting relay only when said thermostatic switch is closed.

* * * * *